United States Patent [19]
Hoshino et al.

[11] Patent Number: 5,602,381
[45] Date of Patent: *Feb. 11, 1997

[54] OBJECTS TO BE CHECKED FOR AUTHENTICITY, AND METHOD AND APPARATUS FOR CHECKING WHETHER OR NOT OBJECTS ARE AUTHENTIC

[75] Inventors: Hidekazu Hoshino; Itsuo Takeuchi; Masumi Yoda; Tatsuya Kurihara; Minoru Komiya, all of Yokohama, Japan

[73] Assignee: NHK Spring Co., Ltd., Yokohama, Japan

[ * ] Notice: The term of this patent shall not extend beyond the expiration date of Pat. No. 5,451,759.

[21] Appl. No.: 243,582

[22] Filed: May 16, 1994

[30] Foreign Application Priority Data

| May 19, 1993 | [JP] | Japan | 5-117118 |
| Dec. 2, 1993 | [JP] | Japan | 5-303032 |
| Dec. 8, 1993 | [JP] | Japan | 5-308317 |

[51] Int. Cl.$^6$ .................................................. G06K 19/12
[52] U.S. Cl. ......................................... 235/493; 235/449
[58] Field of Search .......................... 235/493, 487, 235/449, 380

[56] References Cited

U.S. PATENT DOCUMENTS

| 4,094,462 | 6/1978 | Moschner | 235/380 |
| 4,114,032 | 9/1978 | Brosow et al. | |
| 4,138,057 | 2/1979 | Atalla | 235/380 |
| 4,218,674 | 8/1980 | Brosow et al. | |
| 4,450,348 | 5/1984 | Stockburger et al. | |
| 4,527,051 | 7/1985 | Stenzel | 235/380 |
| 4,820,912 | 4/1989 | Samyn | |
| 5,204,526 | 4/1993 | Yamashita et al. | 235/493 |
| 5,350,558 | 9/1994 | Kawato et al. | 419/35 |
| 5,352,764 | 10/1994 | Mackey | 528/363 |
| 5,434,917 | 7/1995 | Naccache et al. | 380/23 |

Primary Examiner—Donald T. Hajec
Assistant Examiner—Jeffrey R. Filipek
Attorney, Agent, or Firm—Frishauf, Holtz, Goodman, Langer & Chick

[57] ABSTRACT

An object to be checked contains a large number of magnetic polymer elements scattered at random. Each of magnetic polymer elements is made up of an element main body formed of a high molecular material, and magnetic metal powder contained in the element main body. The magnetic polymer elements are integrally incorporated in paper and tangled with the wood pulp fibers of the paper three-dimensionally. In the manufacturing process of the object, a processing apparatus magnetically scans the magnetic polymer elements incorporated in the scanning region of the object while moving the scanning region at a predetermined speed, converts a detection signal obtained by the magnetic scan into a cipher code, and records the cipher code in a code indicator section. In the authenticity checking process, the processing apparatus magnetically scans the magnetic polymer elements once again, and a detection signal obtained thereby is collated with the cipher code recorded in the code indicator section. When the detection signal and the cipher code agree with each other, the object is determined as being authentic.

15 Claims, 9 Drawing Sheets

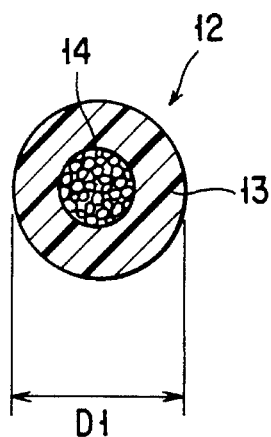
F I G. 1
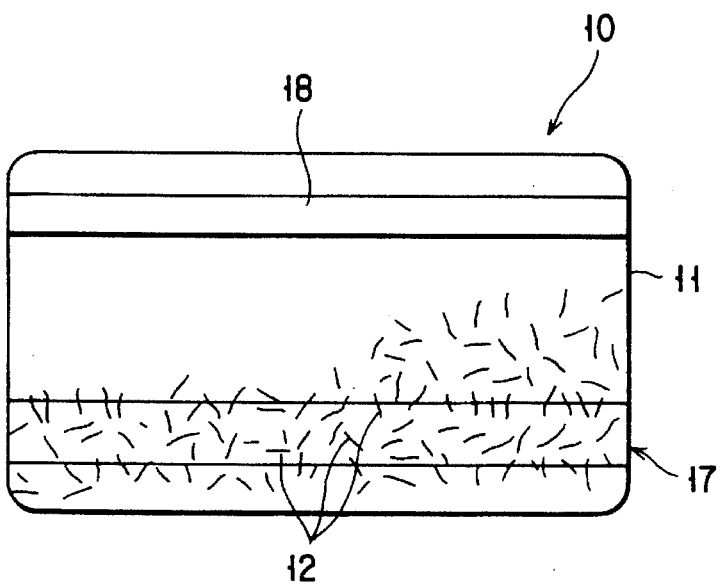
F I G. 2
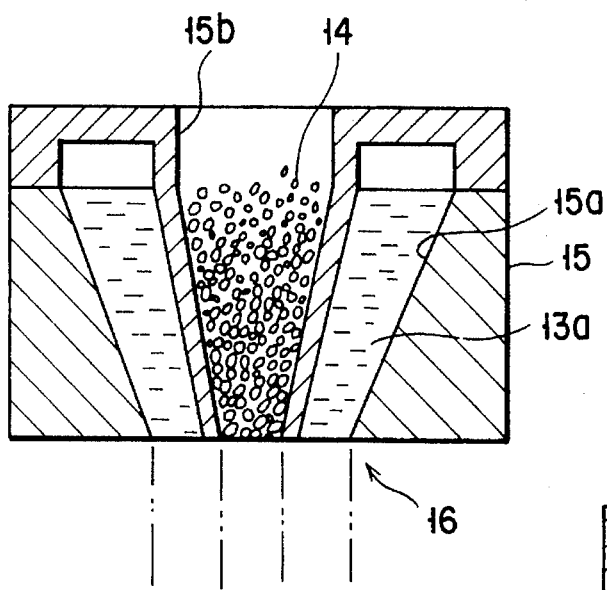
F I G. 3
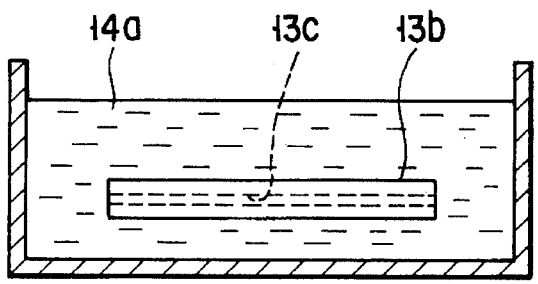
F I G. 4

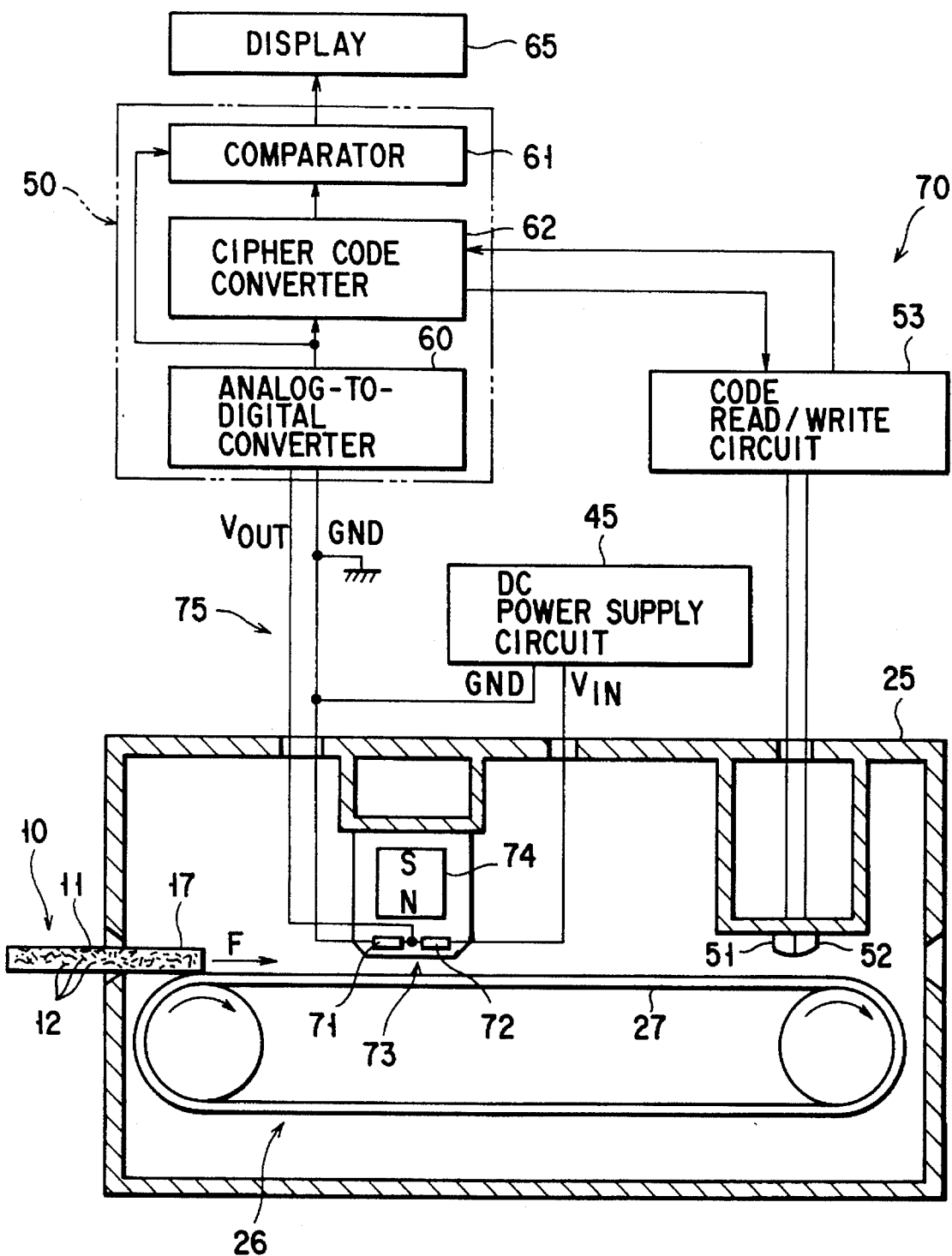
F I G. 9

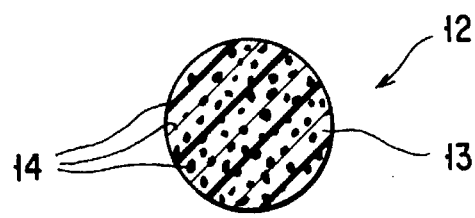
F I G. 10
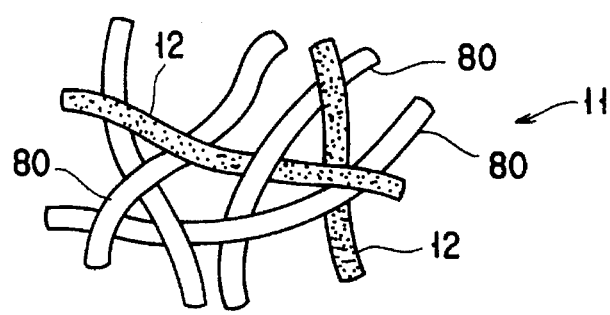
F I G. 11
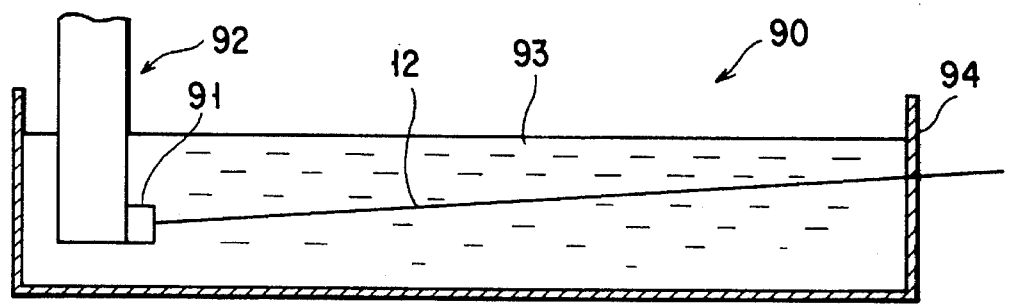
F I G. 12
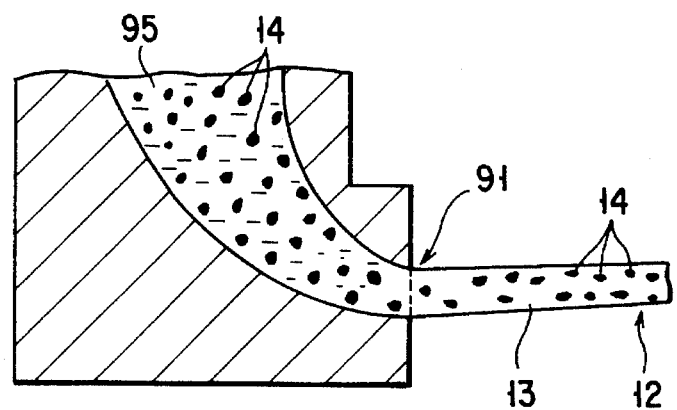
F I G. 13

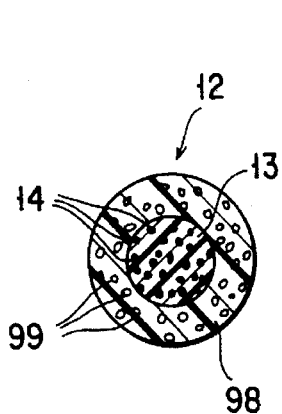
F I G. 14
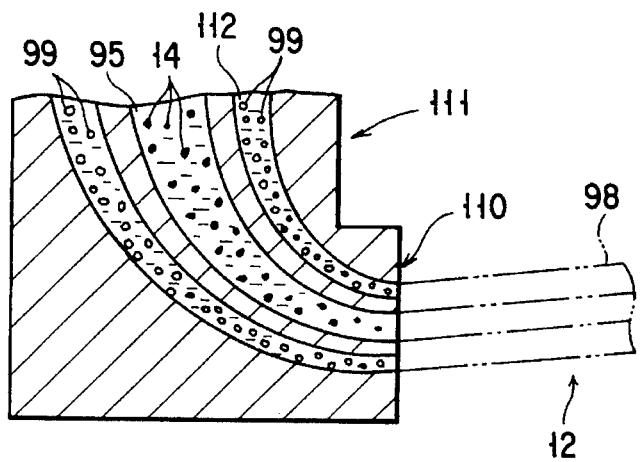
F I G. 15
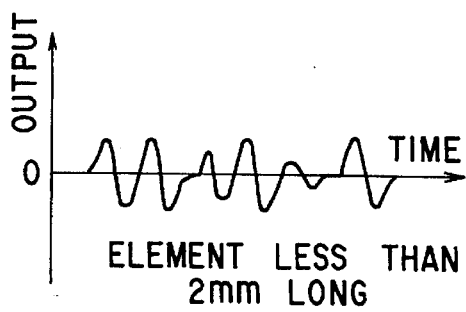
F I G. 16
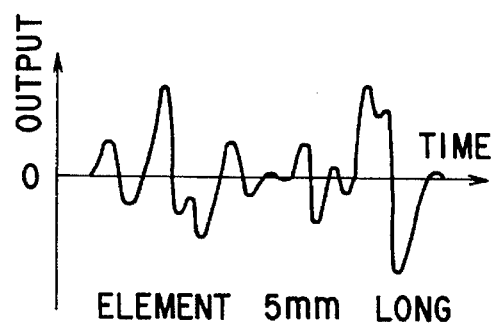
F I G. 17
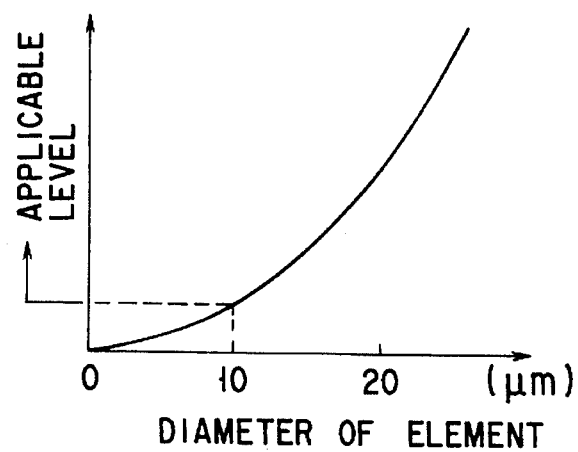
F I G. 18

OBJECTS TO BE CHECKED FOR AUTHENTICITY, AND METHOD AND APPARATUS FOR CHECKING WHETHER OR NOT OBJECTS ARE AUTHENTIC

BACKGROUND OF THE INVENTION

1. Field of the Invention

The present invention relates to objects which should be prevented from being forged and are to be checked for authenticity, such as important documents, securities, paper money, checks, traveler's checks, bank cards, prepaid cards, ID cards, CD cards, credit cards, passports, art objects, and betting tickets for public-managed gambling games (e.g., horse racing and bicycle racing). The present invention also relates to a method and apparatus for checking the objects.

2. Description of the Related Art

A checking method and apparatus utilizing microwaves are known in the art as measures for checking the authenticity of documents or the like, as described in PCT National Publication No. 63-501250 (i.e., U.S. Pat. No. 4,820,912). An object to be checked, wherein stainless steel fibers are embedded and scattered in the sign panel of a card base member, is also known in the art, as described in Jpn. Pat. Appln. KOKAI Publication No. 5-270181.

According to these publications, microwaves are applied to a large number of metallic wires which are embedded and scattered at random in a document or a card, and a proper digital mark responsive to a response microwave bundle is recorded in a suitable region of the document or card according to specific rules. To check the authenticity of the document or card, microwaves are applied to the document or card, and a response microwave bundle is collated with the digital mark. The document or card is determined as being authentic when the microwave bundle and the mark agree with each other.

The checking means which utilizes microwaves, as in the apparatuses of the above publications has problems in that the measurement of a response microwave bundle is susceptible to external noise, and the signal-to-noise ratio (S/N ratio) is lowered thereby. In addition, the apparatuses of the publications may constitute a source of noise since they oscillate microwaves. Further, a microwave transmitter and a microwave receiver are generally large in size and entail high costs.

In the case where metallic wires are embedded in a thin object, such as paper, it is likely that the metallic wires will be exposed in the surface of the object. If this happens, the object does not look nice. In addition, the metallic wires prevent satisfactory printing or coloring from being performed with respect to the object, and may rust, depending upon the environment. Further, if the object is bent, the metallic wires embedded therein may break, protruding from the surface of the object. In the worst case, the code which is assigned to the object in the manufacturing process of the object changes into a different code, and the collation of the code of the card cannot be performed.

On the sign panel of a cash or credit card, a certain kind of data (e.g., a user's name) is written with a writing tool, such as a ball-point pen or a fountain pen. Therefore, the sign panel should be white or whitish. However, if metallic wires, such as stainless steel wires, are embedded in the white or whitish sign panel, they may be externally observed. It should be also noted that the sign panel is thin and the metallic wires embedded in the sign panel may be exposed in the surface of the sign panel. Accordingly, the use of metallic wires is not desirable from the viewpoint of security.

Since metallic wires have a smooth surface, they may hinder a user's name or the like from being clearly written on the sign panel, or may become a cause of ink blotting. In addition, if a sign panel block containing metallic wires is cut into sign panels of desirable size by means of a cutter, the metallic wires may partially project from the faces along which the sign panel block is cut. Further, the cutter does not withstand long use.

If the metallic wires are thin, the problems mentioned above may be solved to a certain degree, but the use of thin metallic wires in no way provides a perfect solution to the problems. In addition, the use of thin metallic wires is not realistic since it results in both a poor S/N ratio and a high manufacturing cost.

SUMMARY OF THE INVENTION

Accordingly, an object of the present invention is to provide a to-be-checked object which is free of the problems entailed in a to-be-checked object containing embedded metallic wires and which ensures a high degree of security and a high S/N ratio. Another object of the present invention is to provide a method and apparatus for reliably checking the object.

To achieve these objects, the present invention provides a to-be-checked object comprising: a base member formed of a nonmagnetic material; a scanning region located at a specific portion of the base member; a plurality of magnetic polymer elements scattered at random in the scanning region and oriented in many and unspecified directions, each of the magnetic polymer elements including a flexible element main body formed of a high molecular material and a magnetic metal contained in the element main body; and a code indicator section for storing encoded information corresponding to an output which is produced in accordance with a state of the magnetic polymer elements scattered in the scanning region.

In a normal case, the code indicator section mentioned above is either a magnetically-readable recording medium (e.g., a magnetic strip) or an optically-readable recording medium (e.g., a bar code). However, the code indicator section may be part of the memory of a host computer, if so desired.

Either powder of a magnetically-soft material having high magnetic permeability (such as Permalloy, Co-based amorphous material, soft ferrite or Sendust) or powder of a magnetically-hard material having high coercive force (such as ferrite, Sm-Co alloy, or Nd alloy), is suitable for use as the magnetic metal mentioned above. In the case where the magnetic metal is formed of powder of a material having high coercive force, the magnetic polymer elements can be magnetized beforehand.

The base member can be formed of paper, for example. Where the base member is formed of paper, the magnetic polymer elements are integrally incorporated in the base member together with the wood pulp fibers of the paper such that they are arranged at random and tangled together three-dimensionally. The high-molecular material used for forming the main bodies of the magnetic polymer elements is acrylic resin, for example. In some cases, it is preferable that the magnetic polymer elements formed of resin be covered with a coating layer having a similar color to that of the base member.

To achieve the objects, the present invention also provides a card-like to-be-checked object comprising: a card-like main body formed of a nonmagnetic material; and a sign panel which is located in a scanning region provided on at least part of the obverse or reverse side of the main body and on which a certain kind of data is to be written, the sign panel including a base member formed of paper and containing a large number of wood pulp fibers, and a plurality of fibrous magnetic polymer elements which are integrally incorporated in the base member together with the wood pulp fibers of the paper, each of the magnetic polymer elements including an element main body formed of a high molecular material and magnetic metal powder contained in the element main body, the card-like main body having a code indicator section for storing encoded information corresponding to a detection signal obtained in accordance with the distributed state of the magnetic polymer elements of the sign panel.

To check whether or not the object is authentic, the present invention provides an apparatus comprising: detection means for magnetically scanning the magnetic polymer elements incorporated inside the scanning region and for producing a detection signal peculiar to the object by detecting an output which varies in accordance with the distributed state of the magnetic polymer elements; means for producing a cipher code by ciphering the detection signal; code writing means for recording the cipher code in the code indicator section of the object; reading means for reading the cipher code recorded in the code indicator section; and means for collating the cipher code read by the reading means with the detection signal produced by the detection means and for determining that the object is authentic when the cipher code and the detection signal agree with each other.

According to the present invention, a large number of magnetic polymer elements are incorporated in the scanning region of the object during the manufacturing process of the object, and a detection signal which is obtained by magnetically scanning the scanning region and which is peculiar to the object is utilized for determining whether or not the object is authentic. To be more specific, the detecting means detects a detection signal which is produced in accordance with the distributed state of the magnetic polymer elements incorporated in the scanning region, with the object being moved at a predetermined speed. Each time the scanning region is scanned by a very short distance, the detection signal varies in accordance with the density, sizes and orientated directions of the magnetic polymer elements. Therefore, the output pattern of the detection signal is specially characteristic of the scanning region. When the object is manufactured, the detection signal is ciphered according to predetermined rules and recorded in the code indicator section.

In the process for checking whether or not the object is authentic, the scanning region is scanned again to obtain a detection signal characteristic of the scanning region, and the cipher code recorded in the code indicator section of the object is read. When the detection signal and the cipher code agree with each other, the object is determined as being authentic.

The magnetic polymer elements incorporated inside the object provided by the present invention are very soft in comparison with metallic wires. Even if the object is thin and is bent, the elements do not break or are not exposed in the surface of the object. Therefore, the surface of the object can maintain a state suitable for printing and coloring. In addition, since the elements do not rust, printing and coloring can be performed reliably. Further, the distribution pattern of the elements does not vary during use of the object.

Since, in the present invention, the magnetic polymer elements incorporated in the scanning region are magnetically detected, external noise from the apparatus does not become a problem, and the S/N ratio is high, accordingly.

In the case where the base member is formed of paper, the magnetic polymer elements are integrally incorporated in the base member together with the wood pulp fibers of the paper. Since, in this case, the magnetic polymer elements and the wood pulp fibers are arranged at random and tangled together three-dimensionally, the degree of integration of the magnetic polymer elements to the base member is high. Therefore, the magnetic polymer elements do not change in position inside the base member, separate from the base member, or form a burr on the surface of the base member. In short, the state of the magnetic polymer elements is very stable. In addition, the object incorporating such magnetic polymer elements withstands long use and ensures a high degree of security. Since the base member can be cut into pieces of desirable sizes, and any data can be printed or written thereon, the object having such a base member can be used for a variety of purposes.

In the sign panel employed in the present invention, the magnetic polymer elements are integrally incorporated in the base member formed mainly of wood pump fibers, and the wood pulp fibers and the magnetic polymer elements are tangled together three-dimensionally. Since it is practically impossible to tamper with the distributed state (particularly, the embedded depth) of the magnetic polymer elements in the sign panel, the object provided by the present invention ensures a high degree of security.

Since the magnetic polymer elements incorporated in the sign panel can be easily coated with a layer of desirable color (e.g., a white layer), they can be prevented from being externally observed. If a paper surface member is provided on the base member of the sign panel, the magnetic polymer elements can be reliably concealed. It should be also noted data can be freely written on the sign panel by using a writing tool or a stamp. Since the sign panel does not contain any metallic wire, it is free of the problem arising from rust. In addition, the sign panel can be easily cut into pieces of desirable sizes by means of a cutter, and the life and performance of that cutter are not adversely affected.

Even if the sign panel is detached from the object and a counterfeit sign panel pasted, this can be easily detected. In addition, since the magnetic polymer elements are prevented from being observed externally of the sign panel, the object provided by the present invention ensures a high degree of security.

According to the present invention, the information which is determined by the distribution of the magnetic polymer elements incorporated in the sign panel is collated with the information recorded in the code indicator section, and the object is determined as being authentic only when the two pieces of information agree with each other. Therefore, the sign panel is very reliable, and is very effective in preventing an unauthorized person from forging an authorized person's signature, for illegal use of a credit card or the like.

BRIEF DESCRIPTION OF THE DRAWINGS

FIG. 1 is a sectional view of a magnetic polymer element employed in a to-be-checked object according to the first embodiment of the present invention;

FIG. 2 is a schematic plan view showing an example of a to-be-checked object;

FIG. 3 is a schematic sectional view showing an apparatus employed for manufacturing the magnetic polymer element depicted in FIG. 1;

FIG. 4 is a sectional view showing another example of an apparatus employed for manufacturing a magnetic polymer element;

FIG. 9 is a partially-sectional schematic side view showing a processing apparatus employed in the third embodiment of the present invention;

FIG. 10 is a sectional view showing another example of a magnetic polymer element incorporated in a to-be-checked object;

FIG. 11 is an enlarged view of a to-be-checked object and shows how magnetic polymer elements are integrally mixed with the wood pulp fibers of paper;

FIG. 12 is a sectional view showing an example of an apparatus used for manufacturing magnetic polymer elements formed of acrylic resin;

FIG. 13 is a sectional view showing part of the apparatus of FIG. 12 in an enlarged scale;

FIG. 14 is a sectional view showing a magnetic polymer element having a coating layer thereon;

FIG. 15 is a sectional view showing part of an apparatus employed for manufacturing the magnetic polymer element depicted in FIG. 14;

FIG. 16 is a graph showing an output produced from magnetic polymer elements having a length of less than 2 mm;

FIG. 17 is a graph showing an output produced from magnetic polymer elements having a length of 5 mm;

FIG. 18 is a graph showing the relationships between an output and the diameter of magnetic polymer elements;

DETAILED DESCRIPTION OF THE PREFERRED EMBODIMENTS

Figure 5:
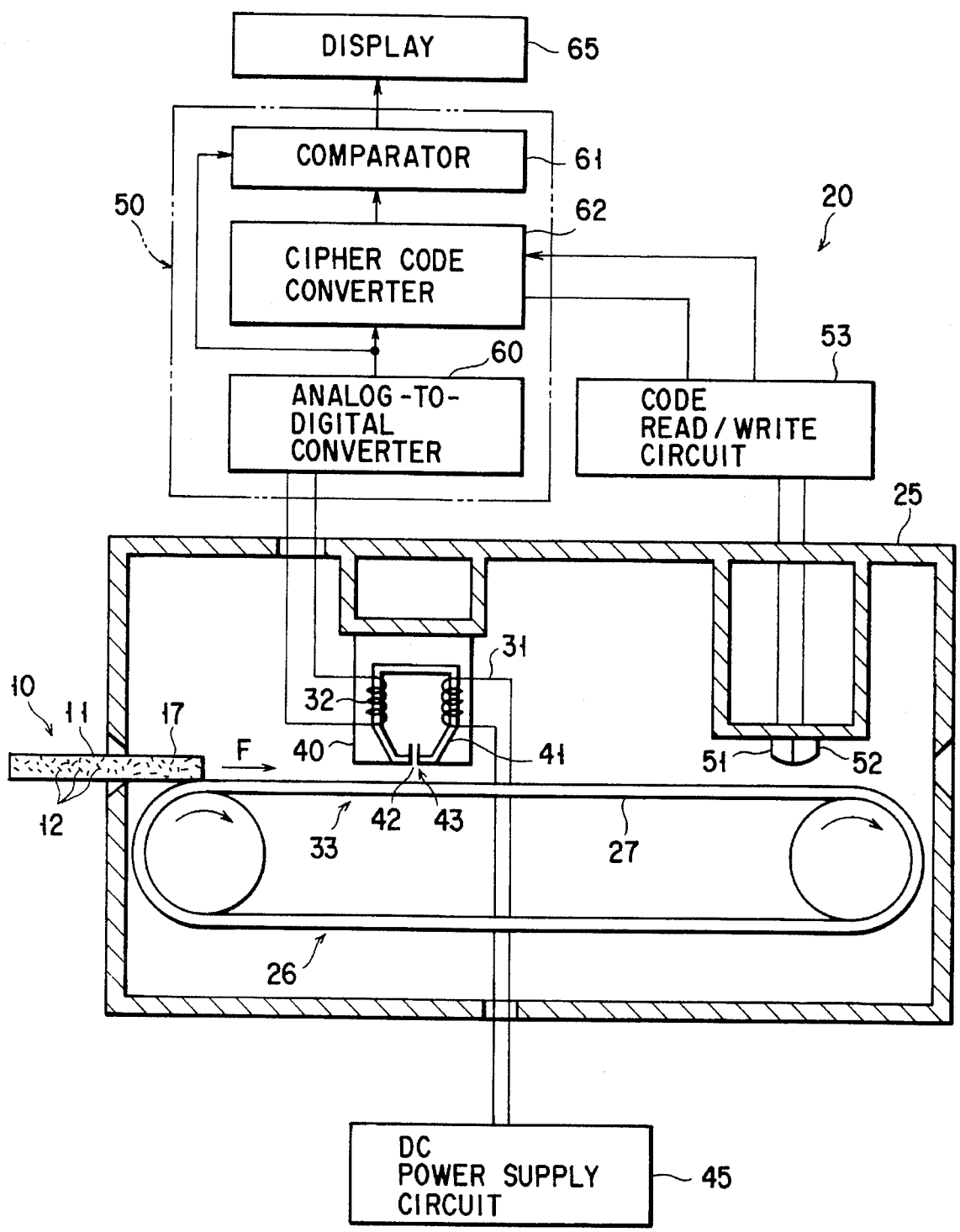
FIG. 5 is a partially-sectional side view showing a processing apparatus employed in the first embodiment of the present invention.

The first embodiment of the present invention will now be described with reference to FIGS. 1 through 7.

As is shown in FIG. 2, a large number of magnetic polymer elements 12 are scattered at random in the base member 11 of an object 10 to be checked, such that the magnetic polymer elements 12 are oriented in many and unspecified directions. The base member 11 is formed of a nonmagnetic material, such as paper or plastics. The magnetic polymer elements 12 are in the form of fibers. As can be seen from the cross section shown in FIG. 1, each magnetic polymer element 12 is made up of an element main body 13 formed of a high molecular material, and magnetic metal powder 14 contained in the interior of the element main body 13.

Examples of the high molecular material of the element main body 13 are polyethylene, polyester, urethane, etc. In other words, any known synthetic resin having flexibility can be used as the material of the element main body 13. Either powder of a magnetically-soft material having high magnetic permeability or powder of a magnetically-hard material having high coercive force is suitable for use as the magnetic metal powder 14.

An example of a method used for manufacturing the magnetic polymer elements 12 is shown in FIG. 3. The manufacturing method shown in FIG. 3 is a dry process employing a double-structure container 15. The double-structure container 15 has an outer chamber 15a and an inner chamber 15b. The outer chamber 15a contains a molten high molecular material 13a which is heated at a temperature of, for example, 200° C. to 500° C. and which is therefore in the molten state, while the inner chamber 15b contains a magnetic metal powder 14. The high molecular material 13a and the magnetic metal powder 14 are allowed to fall or forcibly pushed out from a nozzle 16. While the high molecular material 13a coming out from the nozzle 16 cools and hardens, the magnetic metal powder is incorporated inside the hardened high molecular material 13a.

Another example of a method used for manufacturing the magnetic polymer elements 12 is shown in FIG. 4. The manufacturing method shown in FIG. 4 is a wet process. In this wet process, a pipe 13b formed of a high molecular material and prepared beforehand is immersed in an alkaline solution 14a containing ions of a magnetic metal, thereby permitting the magnetic metal to be deposited on the inner face 13c of the pipe 13b.

The magnetic polymer elements 12 manufactured as above are incorporated in a scanning region 17 at a predetermined density during the manufacture of the object 10. Instead, a nonwoven fabric made of the magnetic polymer elements 12 and cut to have an appropriate size, may be embedded in the scanning region 17 of the object 10.

The magnetic polymer elements 12 shown in the drawings are in the form of fibers. However, they may be in the form of ribbons or foils. In addition, the cross section of the elements 12 need not have a circular shape; it may have a polygonal shape, a rectangular shape, an oval shape, or any other shape desired. The diameter D1 (or thickness) of the magnetic polymer elements 12 must be determined in accordance with the size of the object 10, but it is usually within the range of 5 to 50 μm. The particle diameter of the magnetic metal powder 14 is 1 μm or less, and the average particle diameter thereof is preferably within the range of 0.2 to 0.3 μm. The appropriate mixing ratio of the magnetic metal powder 14 is 40 to 70% by volume. It is desirable that the magnetic metal powder 14 be located in the center of the cross sectional plane of the element 14.

A code indicator section 18 is provided on the object 10. Encoded information which is peculiar to the object 10 and which corresponds to the state in which the magnetic polymer elements 12 are distributed in the scanning region 17, is recorded in the code indicator section 18 by means of a recording apparatus 20 described below.

Where powder of a magnetically-soft material having high magnetic permeability (such as Permalloy (a magnetically permeable iron-based alloy containing about 45–80% nickel), a Co-based amorphous material, a soft ferrite, and Sendust (a magnetic alloy consisting essentially of 85% iron, 9.5% silicon and 5.5% aluminum)) is used as the magnetic metal powder 14 mentioned above, the object 10 is magnetically scanned by the processing apparatus 20 shown in FIG. 5.

The processing apparatus 20 shown in FIG. 5 comprises a housing 25 and a conveyor mechanism 26. The conveyor mechanism 26 has object-conveying components 27, such as a belt and rollers, and conveys the object 10 at a constant speed in the direction indicated by arrow F in FIG. 5.

A pair of induced voltage-detecting coils 33, made up of an excitation coil 31 and a detection coil 32, are arranged in the moving path of the object 10. The excitation coil 31 and the detection coil 32 are provided on the core 41 of a detection head 40. The core 41 is formed of an alloy having high magnetic permeability, and has a gap 42.

A detection section 43 is located in the vicinity of the gap 42. The scanning region 17 of the object 10 is made to pass the detection section 43. A DC power supply circuit 45 for providing the core 41 with a DC bias magnetic field is connected to the excitation coil 31. When a current flows through the excitation coil 31, a certain number of magnetic fluxes pass through the core 41, and part of the bias magnetic field has a magnetic effect on the detection section 43. In the present embodiment, coil 32 is employed as a magnetic detector, but a magnetic detecting element, such as a Hall element, may be employed in place of coil 32.

The processing apparatus 20 comprises the following: a controller 50 incorporating a microcomputer or the like; a code write section 51 for recording a cipher code (which will be described below) in the code indicator section 18 of the object 10; and a code read section 52 for reading the cipher code recorded in the code indicator section 18. The code write section 51 and the code read section 52 are connected to a code read/write circuit 53. The controller 50 includes an analog-to-digital converter 60, a comparator 61, and a cipher code converter 62. A display 65 is connected to the controller 50.

A description will now be given of the operation of the apparatus 20 of the above embodiment.

Figure 6:
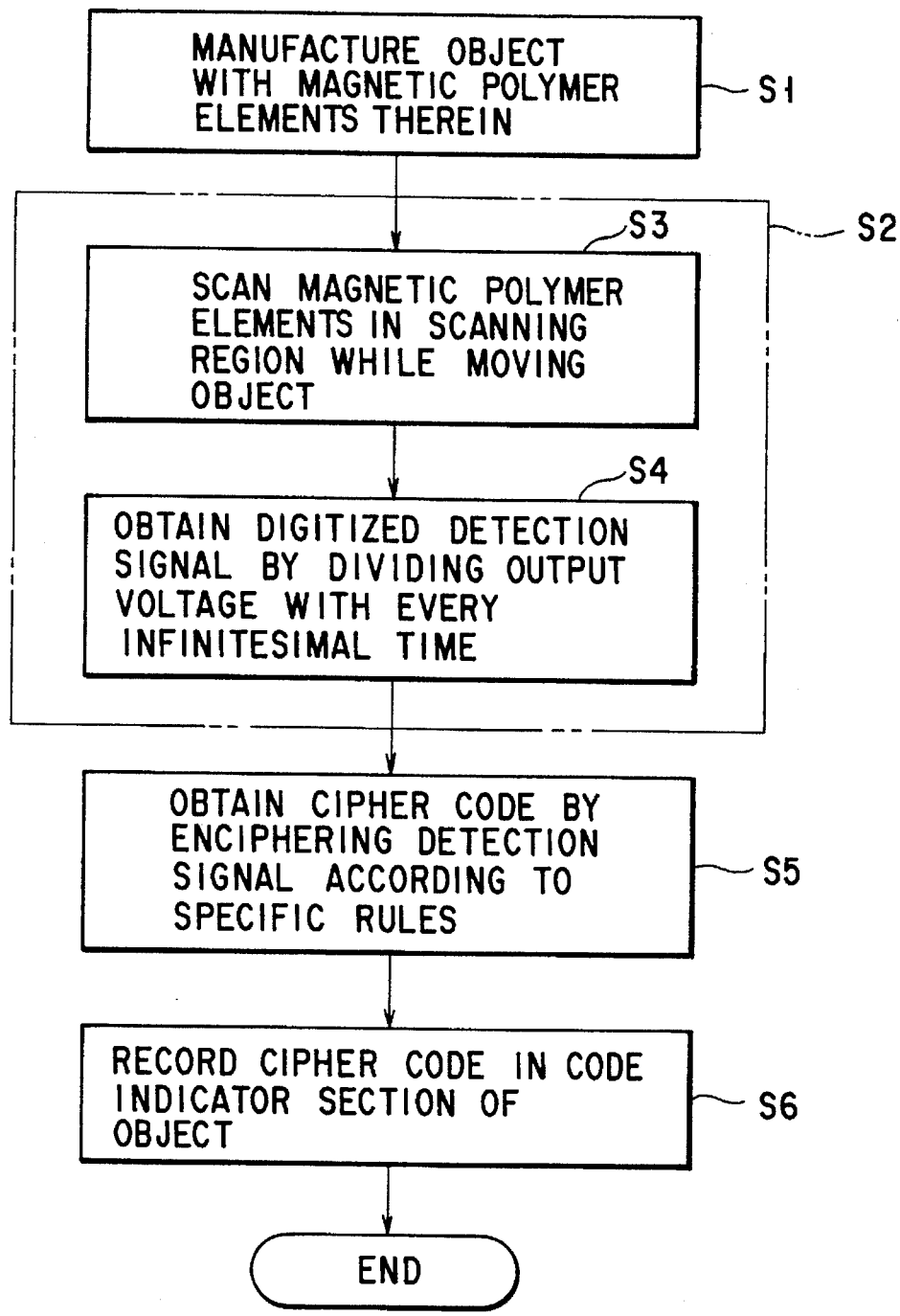
FIG. 6 is a flowchart showing the steps used for manufacturing a to-be-checked object.

FIG. 6 shows the outline of the process used for manufacturing the object 10. In step S1, magnetic polymer elements 12 are incorporated in the base member 11 of the object 10 when the base member 11 is manufactured. In scanning & detection step S2 (which includes both scanning step S3 and detection step S4), the object 10 is moved at a predetermined speed in the direction of arrow F by means of the conveyor mechanism 26, and a detection signal which is peculiar to the object 10 and determined by the distribution of the elements 12 inside the scanning region 17 is obtained.

In scanning step S3, the DC power supply circuit 45 supplies a DC current to the excitation coil 31, thereby applying a bias magnetic field to the core 41. When no magnetic polymer element 12 is present at the detection section 43 of the core 41, the magnetic permeability of the gap 42 remains in the initial state, and the number of magnetic fluxes passing through the core 41 is constant. Since, in this case, a voltage due to electromagnetic induction is not generated in the coil 32, the voltage output from the controller 50 is substantially zero.

when the scanning region 17 of the object 10 passes the detection section 43, with the object 10 being moved at the predetermined speed in the direction of arrow F by means of the conveyor mechanism 26, a number of minute portions of the scanning region 17 sequentially pass the detection section 43. At the time, the magnetic permeability of the gap 42 varies with time in accordance with the distribution of the magnetic polymer elements 12 incorporated in each minute portion of the scanning region 17, and the number of magnetic fluxes passing through the core 41 varies. As a result, a voltage due to electromagnetic induction is generated in the detection coil 32.

Since the induced voltage greatly varies in level in accordance with the density, diameter (thickness), length and orientated directions of the magnetic polymer elements and further with the characteristics of the magnetic metal powder 14, the induced voltage can be measured as an output voltage pattern peculiar to the object 10. In the present embodiment, the scanning region 17 is scanned at the intervals of very short times, and output voltages corresponding to the very short times are ranked in a number of stages, for digitization. In this manner, an encoded detection signal peculiar to the scanning region 17 is obtained. If the magnetic polymer elements 12 are manufactured such that the amounts of magnetic metal powder 14 contained in them are nonuniform, a wide variety of output patterns can be obtained.

In enciphering step S5, the detection signal is converted into a cipher code according to specific rules by means of the cipher code converter 62. In recording step S6, the cipher code is recorded in the code indicator section 18 by means of the magnetic head of the code write section 51. In this embodiment, the code indicator section 18 is a magnetic strip, and the cipher code is magnetically recorded in the magnetic strip. However, the cipher code may be printed on the code indicator section 18 as an optically-readable mark or code (such as a bar code, a two-dimensional bar code, or an OCR character) by means of a printing head. Alternatively, holograms in which predetermined codes are recorded may be sequentially stamped in accordance with the cipher code. Further, the cipher code may be stored in the code storage area of the host computer.

Figure 7:
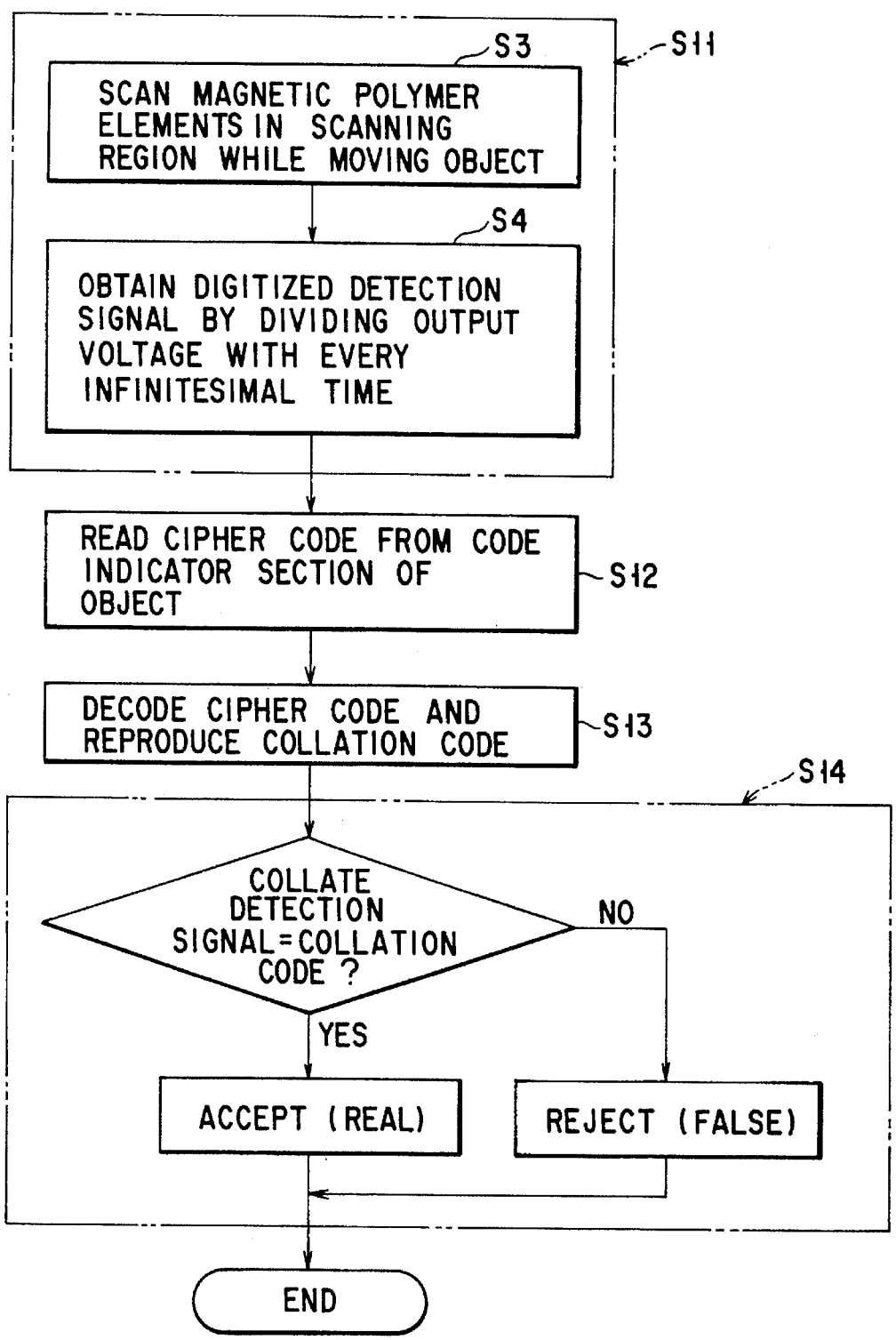
FIG. 7 is a flowchart showing the steps used for checking the object.

The processing apparatus 20 mentioned above is also used for checking whether or not the object 10 is authentic. FIG. 7 shows the outline of the collation process for checking the authenticity of the object 10. Step S11 of this collation process includes scanning step S3 and detection step S4 which are similar to those of the manufacturing process of the object 10, and a detection signal determined by the distribution of the magnetic polymer elements 12 is obtained by scanning the scanning region 17 at the predetermined speed.

In code read step S12 of the collation process, the cipher code recorded in the code indicator section 18 is read by means of the code read section 52. The read cipher code is decoded according to predetermined rules by means of the cipher code converter 62, thus obtaining a code for collation. In determination step S14, this code is collated with the detection signal detected by the detection step S4, by means of the comparator 61. The object 10 is determined as being authentic by the comparator 61 only when the code and the detection signal agree with each other, and the results of collation are indicated on the display 65.

The processing apparatus 20 can reliably read the scanning region 17 even when the external magnetic field applied to the object is not intense. Therefore, the cipher code or other kinds of information which are magnetically recorded in the code indicator section 18 or other portions of the object 10, are not destroyed by the external magnetic field. It should be also noted that the processing apparatus 20 is not easily affected by external noise since an induced voltage is detected by means of the detection coil 32 and the core 41 having the gap 42.

In the case where the cipher code is recorded in the code storage area of the host computer in the manufacturing process of the object 10, the cipher code may be read from the host computer and collated with the detection signal in the collation process. Alternatively, in the collation process, the detection signal obtained in detection step S4 may be converted into a cipher code according to the same rules as those of the manufacturing process, and the cipher code, thus obtained, may be collated with the cipher code read in the code read step S12.

Figure 8:
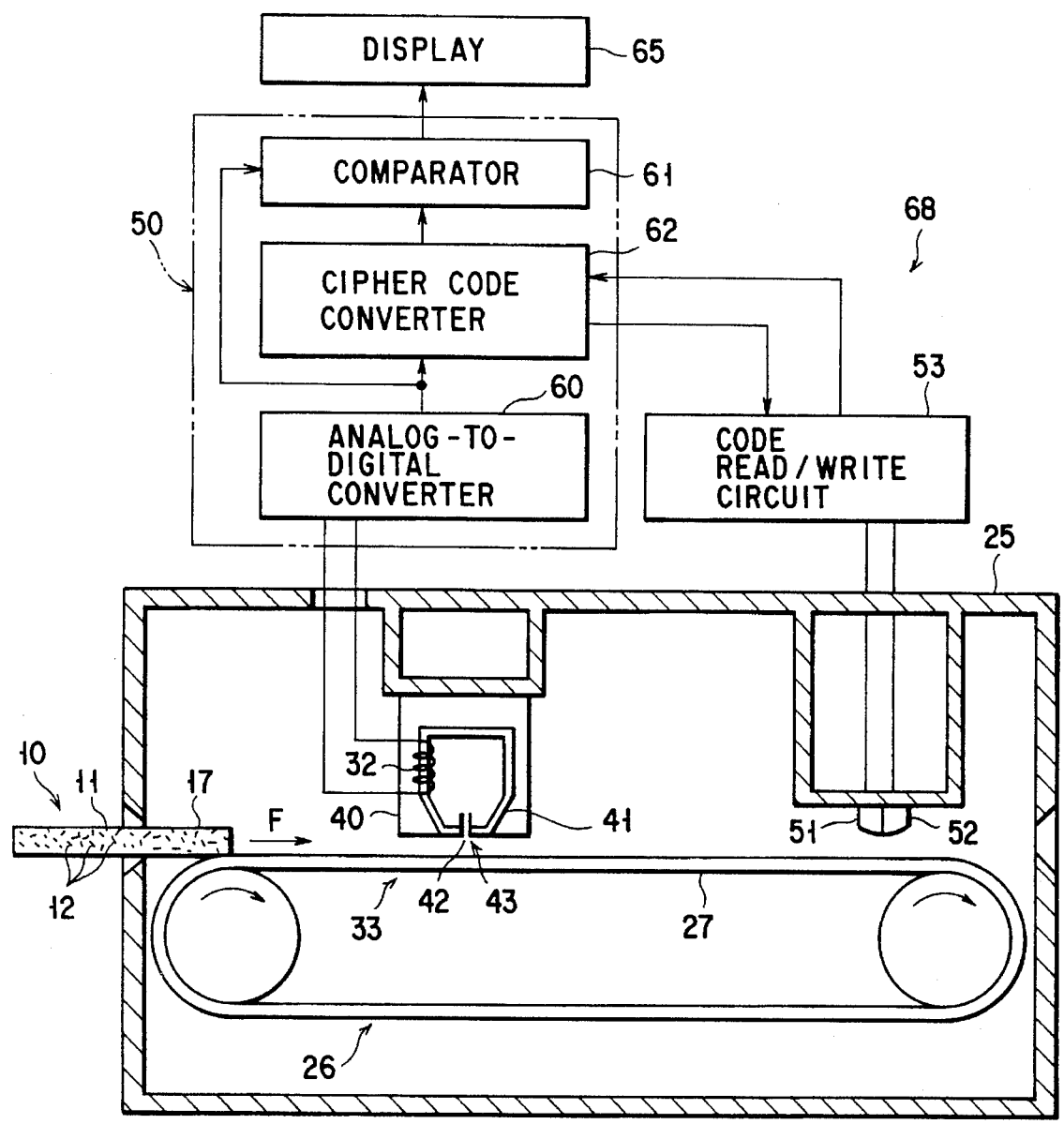
FIG. 8 is a partially-sectional side view showing a processing apparatus according to the second embodiment of the present invention.

In the case where the magnetic metal powder 14 is formed of a material having high coercive force, i.e., a magnetically-hard material, such as ferrite, Sm-Co alloy, and Nd alloy, the magnetic polymer elements 12 can be magnetized beforehand. Since, in this case, the magnetic polymer elements 12 generate magnetic fluxes at all times, the authenticity of the object 10 can be checked by means of a simple processing apparatus 68, such as that shown in FIG. 8. Since the processing apparatus 68 shown in FIG. 8 need not employ the DC power supply circuit 45 or the coil 31 mentioned above, its structure can be simplified, accordingly.

In the embodiments mentioned above, the magnetic polymer elements 12 used in the object 10 are very soft and flexible, and do not break even if they are bent. In the case where the magnetic polymer elements 12 are incorporated in a thin object 10, such as an object formed of paper, the elements 12 do not break or are not exposed from the surface of the object 10 even if the object 10 is bent. In addition, the pattern given to the object 10 during the manufacturing process is not altered even if the object 10 is bent.

The magnetic polymer elements 12 can be easily colored by known coloring means since the element main bodies 13, i.e., the outer portions of the elements 12, are formed of a high molecular material. Even if part of the elements 12 should be exposed from the surface of the object, such elements do not become an obstacle to printing or coloring and can therefore be concealed. In the case where the object 10 is formed of paper, the elements 12 incorporated in the object 10 cannot be observed externally, thus providing a high degree of security.

A processing apparatus 70 according to another embodiment of the present invention will be described with reference to FIG. 9. In FIG. 9, the structural elements which are similar to those of processing apparatus 20 of the above-described embodiment are denoted by the same reference numerals as used in FIG. 5, and explanation of such elements will be omitted herein. Therefore, the following descriptions are limited to the structural elements which are unique to processing apparatus 70.

In the processing apparatus 70 shown in FIG. 9, a magnetic sensor 73 is located at an intermediate position of the moving path of the object 10. The magnetic sensor 73 employs first and second MR (magnetoresistor) elements 71 and 72 as a pair of magneto-electric transducers. The first and second MR elements 71 and 72 are arranged in the moving direction of the object 10 (i.e., in the scanning direction). The magnetic sensor 73 also employs a magnet 74 (i.e., a magnetic field generating means) located behind the MR elements 71 and 72. The magnet 74 may be either a permanent magnet or an electromagnet having an electromagnetic coil.

The MR elements 71 and 72 are magnetoresistor elements whose electrical resistances vary in accordance with the intensity of the magnetic field applied thereto. Either magnetoresistor elements having positive magnetic characteristics (e.g., elements formed of a compound semiconductor, such as indium antimonide or gallium arsenide) or magnetoresistor elements having negative magnetic characteristics (e.g., elements formed of a ferromagnetic material, such as nickel-cobalt or Permalloy) are used in accordance with the specifications required.

The first and second MR elements 71 and 72 are connected together and are arranged such that the magnetic field generated by the magnet 74 acts on them with the same intensity. The first MR element 71 is connected through a detection circuit 75 to a controller 50, while the second MR element 72 is connected to a DC power supply circuit 45. The object 10 is moved such that its scanning region 17 travels in the direction in which the MR elements 71 and 72 are arranged.

When the scanning region 17 of the object 10 passes through the region under the MR elements 71 and 72, output voltage $V_{out}$ varies in accordance with the distribution of the magnetic polymer elements 12 coming into that region. To be more specific, when the magnetic polymer elements 12 are not present in the vicinity of the MR elements 71 and 72, the magnetic field generated by the magnet 74 uniformly acts on the MR elements 71 and 72. Since, in this case, the MR elements 71 and 72 are equal to each other in resistance, output voltage $V_{out}$ is approximately one half ($V_{in}/2$) of input voltage $V_{in}$. When the magnetic polymer elements 12 move in the direction of arrow F and come into the region under the MR elements 71 and 72, the magnetic fluxes passing through each of the MR elements 71 and 72 vary with time in accordance with the position, density, diameter, length, orientated directions and embedded depth of the magnetic polymer elements 12 and further with the characteristics of the magnetic metal powder 14. In addition, a difference is produced between the resistance of one MR element and that of the other. As a result, output voltage $V_{out}$ increases or decreases, with the level of $V_{in}/2$ as a reference level.

Output voltage $V_{out}$ is represented by the following formula:

$$V_{out}=V_{in}\times\{R_2/(R_1+R_2)\}$$

where $R_1$ is a resistance of the first MR element 71, and $R_2$ is a resistance of the second MR element 72.

Since output voltage $V_{out}$ varies in accordance with the distributed state of the magnetic polymer elements 12 (e.g., the distribution density, embedded depth, diameter [thickness], length, orientated directions, etc. of the magnetic polymer elements 12), the detected output voltage pattern is peculiar to the object 10. In this embodiment, the magnetic metal powder 14 is preferably powder of a magnetically-soft material having high magnetic permeability (such as Permalloy, Co-based amorphous material, soft ferrite).

Since the detection signal produced by the magnetic sensor 73 is based on the output ratio between two MR elements 71 and 72, it is not easily affected by the ambient temperature variations or noise. Although the output level of an ordinary magnetic head is dependent upon the moving speed of an object, the processing apparatus 70 of the embodiment, which comprises the magnetic sensor 73, can produce an output of constant level at all times, without being adversely affected by the moving speed of the object and the ambient temperature variations.

A magnetic polymer element 12 used in the embodiment may be such an element as is shown in FIG. 10. In the element depicted in FIG. 10, particles of magnetic metal powder 14 are distributed in the entire cross section of an element main body 13 formed of a high molecular material. As in the foregoing embodiment, the high molecular material of the element main body 13 may be a thermoplastic resin, such as polyethylene, polyester, or urethane. In the case where the base member 11 is formed of paper, however, it is preferable that the element main body 13 be formed of acrylic resin. The mixing ratio of the magnetic metal powder 14 is preferably in the range of 30 to 80% by weight. If the mixing ratio is lower than 30% by weight, an output obtained from the magnetic metal powder 14 may not be high enough for practical use. Conversely, if the mixing ratio exceeds 80% by weight, the magnetic polymer elements 12 greatly deteriorate in strength, particularly tensile strength, and cannot be used in practice.

As is shown in FIG. 11, the magnetic polymer elements 12 are incorporated in the base member 11 formed of paper, such that they are integrally mixed with the wood pulp fibers 80 of the paper and are arranged at random. It should be noted that the magnetic polymer elements 12 can be easily mixed with the wood pulp fibers 80 in that manner in an ordinary paper pulp-manufacturing process.

In the case where the magnetic polymer elements 12 and the wood pulp fibers 80 are integrally mixed with each other, they are arranged at random and tangled together three-dimensionally. Therefore, the magnetic polymer elements 12 do not change in position inside the base member 11, separate from the base member 11, or form a burr on the surface of the base member 11, so that the state of the magnetic polymer elements is very stable. In addition, since the magnetic polymer elements 12 and the wood pulp fibers 80 are tangled together three-dimensionally, the object cannot be easily forged, and a high degree of security is ensured.

The magnetic polymer elements 12 can be manufactured by use of the manufacturing device 90 shown in FIG. 12. The manufacturing device 90 comprises an acrylic solution supply section 92 having a nozzle 91 from which an acrylic solution is jetted; and a solution tub 94 containing a coagulating solution 93. As is shown in an enlarged scale in FIG. 13, an acrylic solution containing a large number of magnetic metal powder particles 14 is made to come out from the nozzle 91 and to pass through the coagulating solution 93. As a result, a magnetic polymer element 12 is obtained wherein a large number of magnetic metal powder particles 14 are contained in an element main body 13 formed of acrylic resin. The magnetic polymer element 12 is cut into pieces such that each cut pieces has a length in the range of 2 to 10 mm.

The cross section of the magnetic polymer elements 12 need not have a circular shape; it may have a rectangular shape, an oval shape, or a polygonal shape. The magnetic polymer elements 12 having such cross sectional shapes can be manufactured by changing the cross sectional shape of the opening of the nozzle 91. If magnetic polymer elements 12 having a flat cross section are manufactured, such magnetic polymer elements can be advantageously incorporated in a thin base member 11.

Where the element main bodies 13 of the magnetic polymer elements 12 are formed of an acrylic resin, the magnetic polymer elements 12 have a specific gravity approximately equal to that of the wood pulp fibers 80. In this case, the magnetic polymer elements 12 and the wood pulp fibers 80 easily mix with each other in the pulp solution. If the surface of the acrylic resin (i.e., the surface of the magnetic polymer elements 12) is observed by means of a microscope, it can be seen that a large number of small projections are present on the surface. This means that the magnetic polymer elements 12 and the wood pulp fibers 80 are strongly tangled together. In the conventional art, metallic wires are likely to collect in the lower region of the pulp solution, so that the metallic wires cannot be easily mixed with the wood pulp fibers. In addition, since the metallic wires used in the conventional art have a smooth surface, they cannot be strongly tangled with the wood pulp fibers.

Like the magnetic polymer element 12 shown in FIG. 14, the outer surface of the element 12 may be covered with a coating layer 98 having a similar color to that of the base member 11. Where the base member 11 is white, a white or whitish coating layer 98 is desirable. Such a coating layer can be prepared, for example, by adding titanium oxide 99 to a high molecular material. Where the base member 11 is brown, a brown coating layer 98 is desirable.

A magnetic polymer element 12 comprising the coating layer 98 mentioned above can be manufactured by means of an acrylic solution supply section 111, such as that shown in FIG. 15. The acrylic solution supply section 111 shown in FIG. 15 comprises a nozzle 110 having a double structure. The acrylic solution 95 containing magnetic metal powder 14 is made to come out into the coagulating solution (FIG. 12), such that the acrylic solution 95 is surrounded by a polymer solution 112 containing titanium oxide 99. In this manner, a magnetic polymer element 12 covered with a coating layer 98 is manufactured.

It is desirable that the magnetic polymer elements 12 have a length in the range of 2 to 10 mm. If the magnetic polymer elements 12 are shorter than 2 mm, they will be uniformly distributed in the base member, just like powder, and the processing apparatuses 20 and 70 presently available cannot produce an output indicative of to the distribution of the magnetic polymer elements 12. The output which the presently-available processing apparatuses 20 and 70 can produce from such uniform element distribution will be such as that shown in FIG. 16. If the magnetic polymer elements 12 are, for example, 5 mm in length, the output obtained by the processing apparatuses is indicative of the distribution of the elements 12, as shown in FIG. 17. If the elements 12 are longer than 10 mm, the elements 12 do not easily mix with the wood pulp fibers 80 in the pulp solution, and with the presently-available paper making technology, it is not easy to integrally incorporate such long elements in paper.

It is desirable that the magnetic polymer elements 12 have a diameter within the range between 10 μm to 100 μm. As can be seen from FIG. 18, magnetic polymer elements 12 having a diameter of 10 μm or greater produces an output of applicable level, as long as they contain a sufficiently large amount of magnetic metal powder 14. The use of magnetic polymer elements having a large diameter is desirable since such elements produce an output of high level. However, if the elements 12 have a diameter greater than 100 μm, part of such elements will be projected from the surface of a paper base member 11 (it is assumed that the thickness of the paper base member is 100 μm or thereabouts). In practice, therefore, the use of magnetic polymer elements 12 having a diameter of 100 μm or greater is not desirable. In short, the diameter of the magnetic polymer elements 12 should be smaller than the thickness of the base member 11.

A to-be-checked object according to another embodiment of the present invention will now be described with reference to FIGS. 19 through 23. In FIGS. 19–23, the structural elements which are similar to those of the foregoing embodiments are denoted by the same reference numerals as used in the above descriptions, and a detailed description of such elements will be omitted herein.

Figure 19:
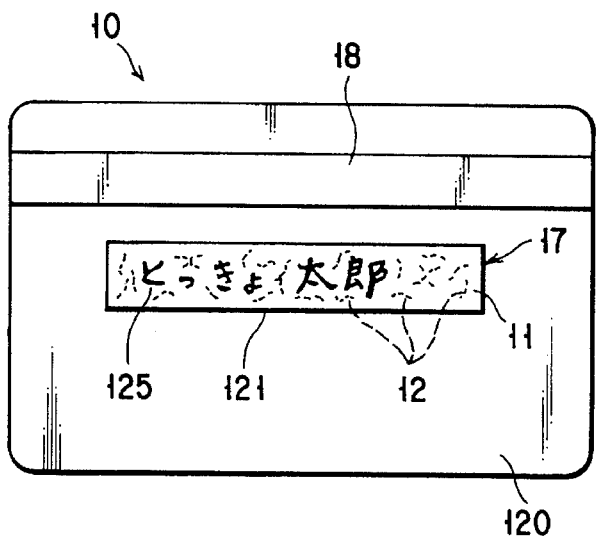
FIG. 19 is a plan view showing another example of a to-be-checked object.

The object 10 shown in FIG. 19 comprises a card-like main body 120, and a sign panel 121 provided on part of the obverse or reverse side of the main body 120. The sign panel 121 serves as a scanning region 17. In general, the main body 120 is formed of a synthetic resin, such as polyethylene or vinyl chloride, but it may be formed of paper.

Figure 20:
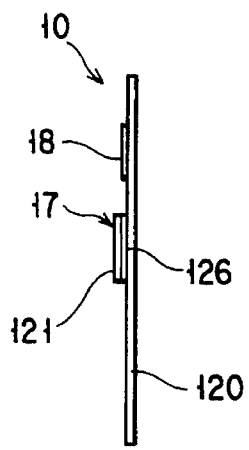
FIG. 20 is a side view of the object depicted in FIG. 19.
Figure 21:
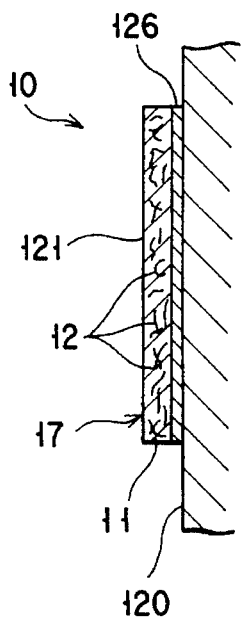
FIG. 21 is an enlarged sectional view showing the sign panel provided on the object depicted in FIG. 19.

On the sign panel 121, a certain kind of data (such as the signature of the card owner) is written with a writing tool, such as a ball-point pen or a fountain pen. As is shown in FIGS. 20 and 21, the sign panel 121 is secured to the main body 120 by means of an adhesive 126. The adhesive 126 is a thermoplastic synthetic resin or another kind of adhesive material.

A code indicator section 18 is provided on the object 10. Information which is peculiar to the object 10 and which is determined by the distribution of the magnetic polymer elements incorporated in the sign panel 121 is encoded and recorded in the code indicator section 18 by means of the processing apparatus 70 shown in FIG. 9. As is depicted in FIG. 19, the code indicator section 18 is a magnetic strip narrower than the main body 120. Alternatively, it may be a recording medium on which optically-readable data, such as a bar code, a two-dimensional bar code, or an OCR character, is indicated.

The sign panel 121 comprises a white or whitish base member 11 formed of paper, and a large number of magnetic polymer elements 12 are integrally incorporated in the base member 11 such that they are oriented in many and unspecified directions.

Each magnetic polymer element 12 is a fibrous element and, as shown in FIG. 10, is made up of an element main body 13 formed of a high molecular material, and magnetic metal powder 14 distributed in the entire cross section of the element main body 13. Acrylic resin is suitable as the material of the high molecular material of the element main body 1, but a thermoplastic resin, such as polyethylene, polyester, or urethane, may be used in place of the acrylic resin. In short, any kind of synthetic resin can be used as the material of the element main body 13, as long as the synthetic resin has appropriate flexibility.

The magnetic polymer elements 12 can be manufactured by means of the manufacturing device 90 (FIGS. 12 and 13) mentioned above. The mixing ratio of the magnetic metal powder 14 is preferably in the range of 30 to 80% by weight. If the mixing ratio is lower than 30% by weight, an output obtained from the magnetic metal powder 14 may not be high enough for practical use. Conversely, if the mixing ratio exceeds 80% by weight, the magnetic polymer elements 12 greatly deteriorate in strength, particularly tensile strength, and cannot be used in practice. The particle diameter of the magnetic metal powder 14 should be 1 μm or less, and the average particle diameter thereof is preferably within the range of 0.2 to 0.3 μm.

The signal panel 121 is manufactured by the following steps: the step of preparing a pulp solution in which wood pulp fibers 80 and magnetic polymer elements 12 are mixed with each other; a step of making a sheet-like object from the pulp solution such that the wood pulp fibers 80 and the magnetic polymer elements 12 are tangled together three-dimensionally in the sheet-like object; and a step of cutting the sheet-like object into pieces of desirable size. Through these steps, a sign panel 121 having predetermined size is manufactured. As is shown in FIG. 11, the base member 11 contains a large number of wood pulp fibers 80, and the magnetic polymer elements 12 are integrally mixed with these wood pulp fibers 80.

Figure 22:
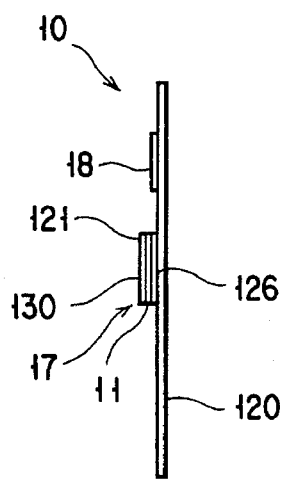
FIG. 22 is a side view of a to-be-checked object for which a sign panel having a surface member is provided.
Figure 23:
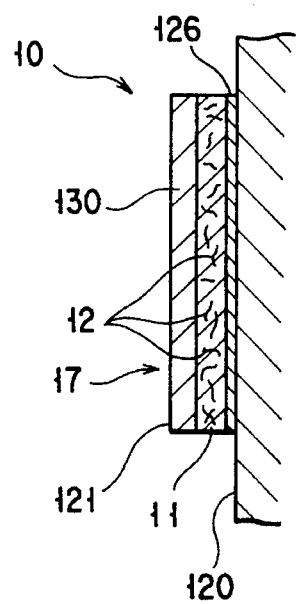
FIG. 23 is an enlarged sectional view of the sign panel depicted in FIG. 22.

A surface member 130 formed mainly of paper may be provided on the surface of the base member 11, as shown in FIGS. 22 and 23. A certain kind of data can be written on the surface member 130, and the surface member 130 serves to conceal the magnetic polymer elements 12 incorporated in the base member 11.

According to the present invention, the magnetic polymer elements 12 can be embedded in the reverse side of the canvas of a painting, and the cipher code mentioned above can be recorded in a code indicator section. These procedures provide a proof that the painting is authentic. According to the present invention, moreover, the magnetic polymer elements 12 can be embedded in a three-dimensional art object, so as to distinguish it from its imitations.

What is claimed is:

1. An object which can be checked for authenticity, said object comprising:

a base member formed of a nonmagnetic material, said base member comprising paper containing a plurality of wood pulp fibers;

a scanning region located at a specific portion of said base member;

a plurality of magnetic polymer elements scattered at random in said scanning region and oriented in a plurality of unspecified directions, each of said magnetic polymer elements including a flexible element main body formed of a high molecular material and having a powder of magnetically-soft material contained therein, said high molecular material being selected from the group consisting of polyethylene, polyester, urethane, and acrylic resin, and said powder of magnetically-soft material having a particle diameter of 1 μm or less and high permeability;

said magnetic polymer elements being integrally incorporated in the paper of said base member together with the wood pulp fibers of the paper such that the wood pulp fibers and said magnetic polymer elements are tangled together three-dimensionally; and a code indicator section for storing encoded information corresponding to an output which is obtained in accordance with a state of said magnetic polymer elements scattered in said scanning region.

2. The object according to claim 1, wherein said powder of magnetically-soft material contained in said element main body of said magnetic polymer elements scattered at random in said scanning region of said object is selected from the group consisting of Permalloy, a Co-based amorphous material, a soft ferrite, and Sendust.

3. The object according to claim 1, wherein the high molecular material of the element main body of the magnetic polymer element comprises an acrylic resin.

4. The object according to claim 1, wherein each of said magnetic polymer elements is covered with a coating layer having a similar color to that of the base member.

5. The object according to claim 4, wherein said base member is white, and said coating layer is a white or whitish coating layer formed of a high molecular material containing titanium oxide.

6. A card-like object which can be checked for authenticity, comprising:

a card-like main body formed of a nonmagnetic material; and a sign panel located in a scanning region provided on at least part of an obverse or reverse side of said card-like main body, said sign panel having a predetermined kind of data written thereon, and said sign panel including:

a base member formed of paper containing a plurality of wood pulp fibers; and a plurality of fibrous magnetic polymer elements integrally incorporated in said base member together with the wood pulp fibers, said magnetic polymer elements and the wood pulp fibers being tangled together three-dimensionally, each of said magnetic polymer elements having an element main body formed of a high molecular material and having a powder of magnetically-soft material contained therein, said high molecular material being selected from the group consisting of polyethylene, polyester, urethane, and acrylic resin, and said powder of magnetically-soft material having a particle diameter of 1 µm or less and high permeability, and said card-like main body having a code indicator section for storing encoded information corresponding to a detection signal which is obtained in accordance with a state of said magnetic polymer elements of said sign panel.

7. The card-like object according to claim 6, wherein said powder of magnetically-soft material contained in said element main body of said magnetic polymer elements scattered at random in said scanning region of said object is selected from the group consisting of Permalloy, a Co-based amorphous material, a soft ferrite, and Sendust.

8. The card-like object according to claim 6, wherein said code indicator section includes a magnetically or optically readable recording medium for retaining encoded information.

9. The card-like object according to claim 6, further comprising a coating layer which covers an outer circumference of each of the magnetic polymer elements and which has a similar color to that of the base member.

10. The card-like object according to claim 9, wherein said base member is white, and said coating layer is a white or whitish coating layer formed of a high molecular material containing titanium oxide.

11. The card-like object according to claim 6, further comprising a surface member formed mainly of paper and provided on the base member of the sign panel.

12. A method of manufacturing and checking the authenticity of an object, said object comprising a base member formed of a nonmagnetic material, a scanning region located at a specific portion of said base member, a plurality of magnetic polymer elements scattered at random in said scanning region, and a code indicator section for storing encoded information, each of said magnetic polymer elements including an element main body formed of a high molecular material and having a powder of magnetically-soft material contained therein, said high molecular material being selected from the group consisting of polyethylene, polyester, urethane, and acrylic resin, and said powder of magnetically-soft material having a particle diameter of 1 µm or less and high permeability, said method comprising:

a manufacturing process including:
a scanning step of magnetically scanning said magnetic polymer elements scattered in said scanning region of said object;
a detection step of producing a detection signal specific to said object by detecting an output which varies in accordance with a distribution of said magnetic polymer elements scattered in said scanning region of said object;
a step of producing a cipher code by ciphering the detection signal; and a step of recording the cipher code in said code indicator section of said object; and a collation process including:
a scanning step of magnetically scanning said magnetic polymer elements scattered in said scanning region of said object;
a detection step of producing a detection signal specific to said object by detecting an output which varies in accordance with a distribution of said magnetic polymer elements scattered in said scanning region of said object;
a code reading step of reading the cipher code recorded in said code indicator section of said object; and
a determination step of determining that said object is authentic when the cipher code and the detection signal agree with each other.

13. The method according to claim 12, wherein said powder of magnetically-soft material contained in said element main body of said magnetic polymer elements scattered at random in said scanning region of said object is selected from the group consisting of Permalloy, a Co-based amorphous material, a soft ferrite, and Sendust.

14. An apparatus for checking the authenticity of an object, said object comprising a base member formed of a nonmagnetic material, a scanning region located at a specific portion of said base member, a plurality of magnetic polymer elements scattered at random in said scanning region, and a code indicator section for storing encoded information, each of said magnetic polymer elements including an element main body formed of a high molecular material and having a powder of magnetically-soft material contained therein, said high molecular material being selected from the group consisting of polyethylene, polyester, urethane, and acrylic resin, and said powder of magnetically-soft material having a particular diameter of 1 µm or less and high permeability and being formed of a magnetic material having at least one of a high coercive force and a high magnetic permeability, said apparatus comprising:

detection means for magnetically scanning said magnetic polymer elements scattered in said scanning region of said object, said detection means producing a detection signal specific to said object by detecting an output which varies in accordance with a distribution of said magnetic polymer elements;

cipher code means for producing a cipher code by ciphering the detection signal;

code write means for recording the cipher code in said code indicator section of said object;

reading means for reading the cipher code recorded in said code indicator section of said object; and collating means for collating the cipher code read by said reading means with the detection signal produced by said detection means, and for determining that said object is authentic when the cipher code and the detection signal agree with each other.

15. The apparatus according to claim 14, wherein said powder of magnetically-soft material contained in said element main body of said magnetic polymer elements scattered at random in said scanning region of said object is selected from the group consisting of Permalloy, a Co-based amorphous material, a soft ferrite, and Sendust.

* * * * *